US006407697B1

(12) United States Patent
Hager et al.

(10) Patent No.: US 6,407,697 B1
(45) Date of Patent: Jun. 18, 2002

(54) LOW PROBABILITY OF INTERCEPT COHERENT RADAR ALTIMETER

(75) Inventors: James R. Hager, Golden Valley; Curtis J. Petrich, Minneapolis; John H. Keuper, Ramsey, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/594,653

(22) Filed: Jun. 15, 2000

(51) Int. Cl.[7] .............................................. G01S 13/08
(52) U.S. Cl. ....................................................... 342/120
(58) Field of Search ................................ 342/120, 135, 342/195, 200, 175

(56) References Cited

U.S. PATENT DOCUMENTS

| 4,241,346 | A |   | 12/1980 | Watson |   |
|---|---|---|---|---|---|
| 4,429,310 | A |   | 1/1984 | Zsxheile, Jr. et al. |   |
| 4,568,938 | A |   | 2/1986 | Ubriaco |   |
| 4,959,654 | A |   | 9/1990 | Bjorke et al. |   |
| 5,014,063 | A |   | 5/1991 | Studenny |   |
| 5,150,125 | A |   | 9/1992 | Hager |   |
| 5,592,131 | A | * | 1/1997 | Labreche et al. | ............ 342/175 |
| 5,719,582 | A | * | 2/1998 | Gray | ........................ 342/120 |
| 5,898,401 | A |   | 4/1999 | Walls |   |

OTHER PUBLICATIONS

Griffiths Et Al.; Digital Generation of High Time–Bandwidth Product Linear FM WaveForms for Radar Altimeters; Apr. 1992; IEE Proceedings; vol. 139, No. 2; pp. 160–169.*
Author: M. Burgos–Garcia, J. Sanmartin–Jara, Title: "A LPI Tracking Rader System Based on Frequency Hopping", IRS 98 International Radar Symposium. Proceedings of the Symposium, Munch, Sept. 15–17, 1998, Vol. 1, Sept. 15, 1998, pp. 151–159, XP000781800.
Author: JRH, Title: Low Cost, Low Probability Of Intercept (LPI) Coherent Altimeter Module , Date: May 12, 1999 Complete document (5 pages).

* cited by examiner

*Primary Examiner*—Daniel T. Pihulic
(74) *Attorney, Agent, or Firm*—Dennis C. Bremer

(57) ABSTRACT

A radar altimeter for determining altitude of an air vehicle with respect to ground comprises a digital sequencer for digitally modulating a first signal. A transmitter coupled to the digital sequencer transmits a radar signal including the modulated first signal toward the ground. A receiver receives a reflected radar signal from the ground. The received radar signal includes the modulated first signal. A digitizer coupled to the receiver generates digital samples of the modulated first signal. A digital signal processor coupled to the digitizer receives digital samples of the modulated first signal from the digitizer, demodulates the received digital samples, processes the demodulated digital samples and outputs altitude data based on the demodulated digital samples.

28 Claims, 5 Drawing Sheets

LOW PROBABILITY OF INTERCEPT COHERENT RADAR ALTIMETER

CROSS-REFERENCE TO RELATED APPLICATION(S)

None.

BACKGROUND OF THE INVENTION

The present invention relates to a radar altimeter, and more particularly to a low probability of intercept (LPD) coherent radar altimeter.

Existing radars with high performance LPI capability, high altitude operation, frequency agility, transmission power management, and a phase coded spread spectrum transmission format arc large multi-board assemblies. It would be desirable for a radar altimeter to digitize all control and signal processing functions, such that the system could be reduced to a single digital signal processor (DSP) chip and a couple of radio frequency (RF) hybrid circuits. For example, modulation of the transmission signal is normally done with discrete analog circuitry. By moving the modulation process into the DSP, numerous control circuits and interface leads are eliminated. By performing each function digitally in the DSP, the function is not only eliminated from the discrete printed circuit board (PCB) circuitry, but its associated control-interface circuit and interface pin-outs arc also eliminated. Further, by running the digitizer at a high sampling frequency (e.g., 120 MHz), normal high resolution enhancement functions are eliminated (e.g., programmable delay lines, RF wide-band gate and correlation functions).

A problem that occurs in existing radar altimeters is frequency drift of the transmission signal with respect to the center frequency of processing filters. Solving this problem requires either a relatively elaborate circuit to compensate for drift, or the use of a processing bandwidth wide enough to encompass the drift, which results in degraded sensitivity. It would be desirable for a radar altimeter to provide a simpler means for compensating for drift that does not result in degraded sensitivity.

BRIEF SUMMARY OF THE INVENTION

A radar altimeter for determining altitude of an air vehicle with respect to ground comprises a digital sequencer for digitally modulating a first signal. A transmitter coupled to the digital sequencer transmits a radar signal including the modulated first signal toward the ground. A receiver receives a reflected radar signal from the ground. The received radar signal includes the modulated first signal. A digitizer coupled to the receiver generates digital samples of the modulated first signal. A digital signal processor coupled to the digitizer receives digital samples of the modulated first signal from the digitizer, demodulates the received digital samples, processes the demodulated digital samples and outputs altitude data based on the demodulated digital samples.

The radar altimeter of the present invention digitizes control and signal processing functions, allowing the system to be reduced to a single digital signal processor (DSP) chip, a sequencer chip, and a couple of radio frequency (RF) hybrid circuits. The radar altimeter compensates for frequency drift of the transmission signal with respect to the center frequency of processing filters by generating an intermediate frequency transmission signal from the digitizer sampling frequency source. Therefore, the IF transmission signal drifts with the sampling frequency and processing filter center frequency.

DETAILED DESCRIPTION

Figure 1:
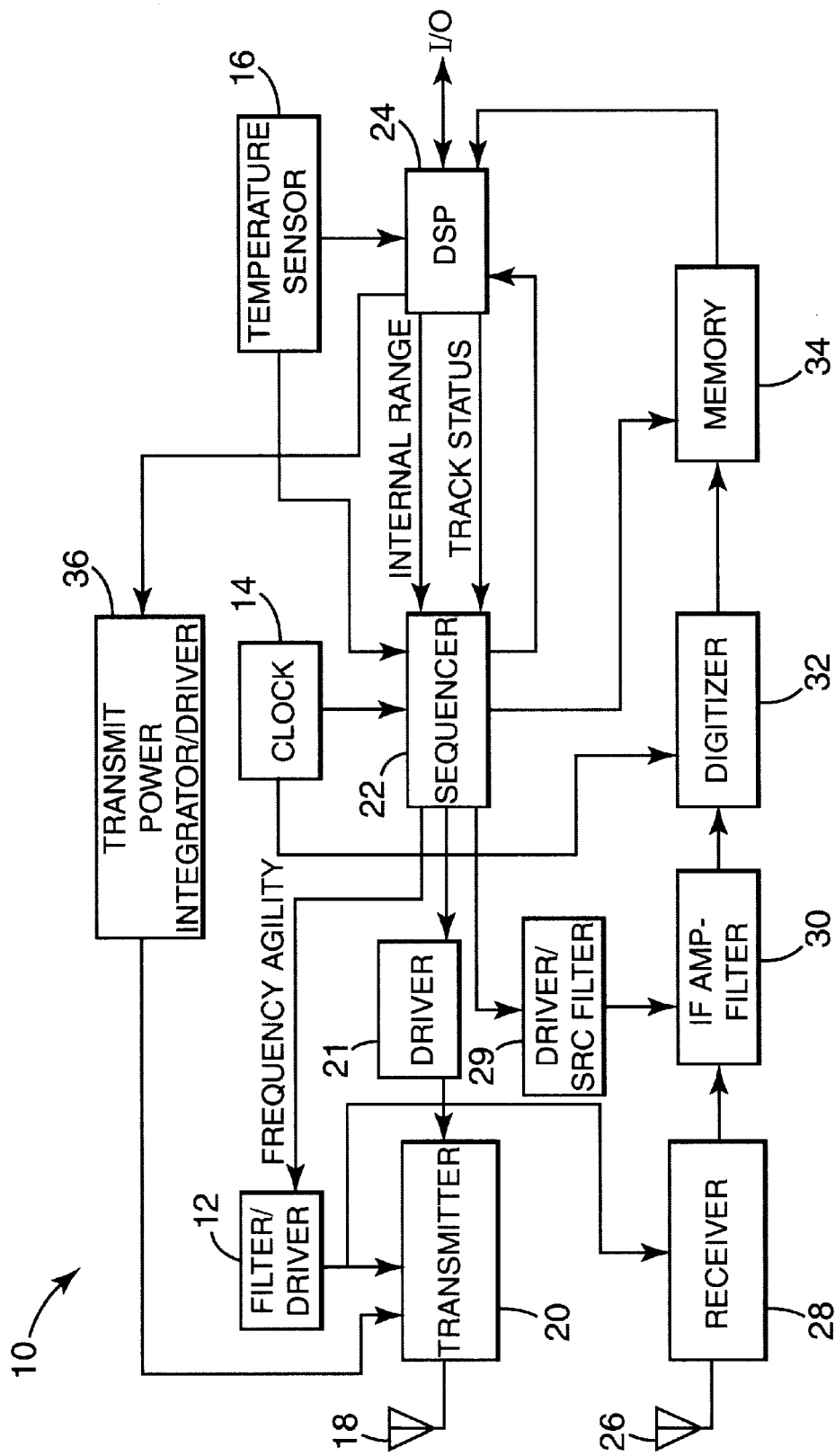
FIG. 1 shows a block diagram of a radar altimeter according to the present invention.

FIG. 1 shows a block diagram of a low probability of intercept (LPI) coherent radar altimeter according to the present invention. In a preferred embodiment, radar altimeter 10 is incorporated in an air vehicle. Radar altimeter 10 includes filter/driver 12, clock 14, temperature sensor 16, transmit antenna 18, transmitter 20, driver 21, sequencer 22, digital signal processor (DSP) 24, receive antenna 26, receiver 28, driver/sensitivity range control (SRC) filter 29, intermediate frequency (IF) amplifier-filter 30, digitizer 32, memory 34 and transmit power integrator/driver 36.

Transmitter 20 transmits pulses of RF energy through antenna 18. The RF energy is modulated with a pulse compression Bi-phase coded format produced by sequencer 22. The output power of transmitter 20 is controlled in a closed loop fashion by DSP 24, which is coupled to transmit power integrator/driver 36. The output power of transmitter 20 is minimized by DSP 24 for low probability of detection by enemy detectors.

Antenna 26 receives radar signals reflected from the ground. The received signals are amplified and mixed down to IF by receiver 28, and further amplified and band limited by IF amplifier-filter 30. Digitizer 32 digitizes the received signal and outputs the digitized samples to memory 34.

Sequencer 22 selects ground return samples corresponding to a present altitude delay (as determined by DSP 24 and communicated to sequencer 22 on an internal range line) and shifts the selected samples from memory 34 to DSP 24. DSP 24 then determines if the next set of samples should be taken closer in or further out in range, and generates a new internal range command. The result is a closed-loop altitude tracking servo, such that as the altitude changes, DSP 24 generates a measure of range tracking error which is used to change the internal range command fed back to sequencer 22. DSP 24 generates an output altitude from the internal range.

Figure 2A:
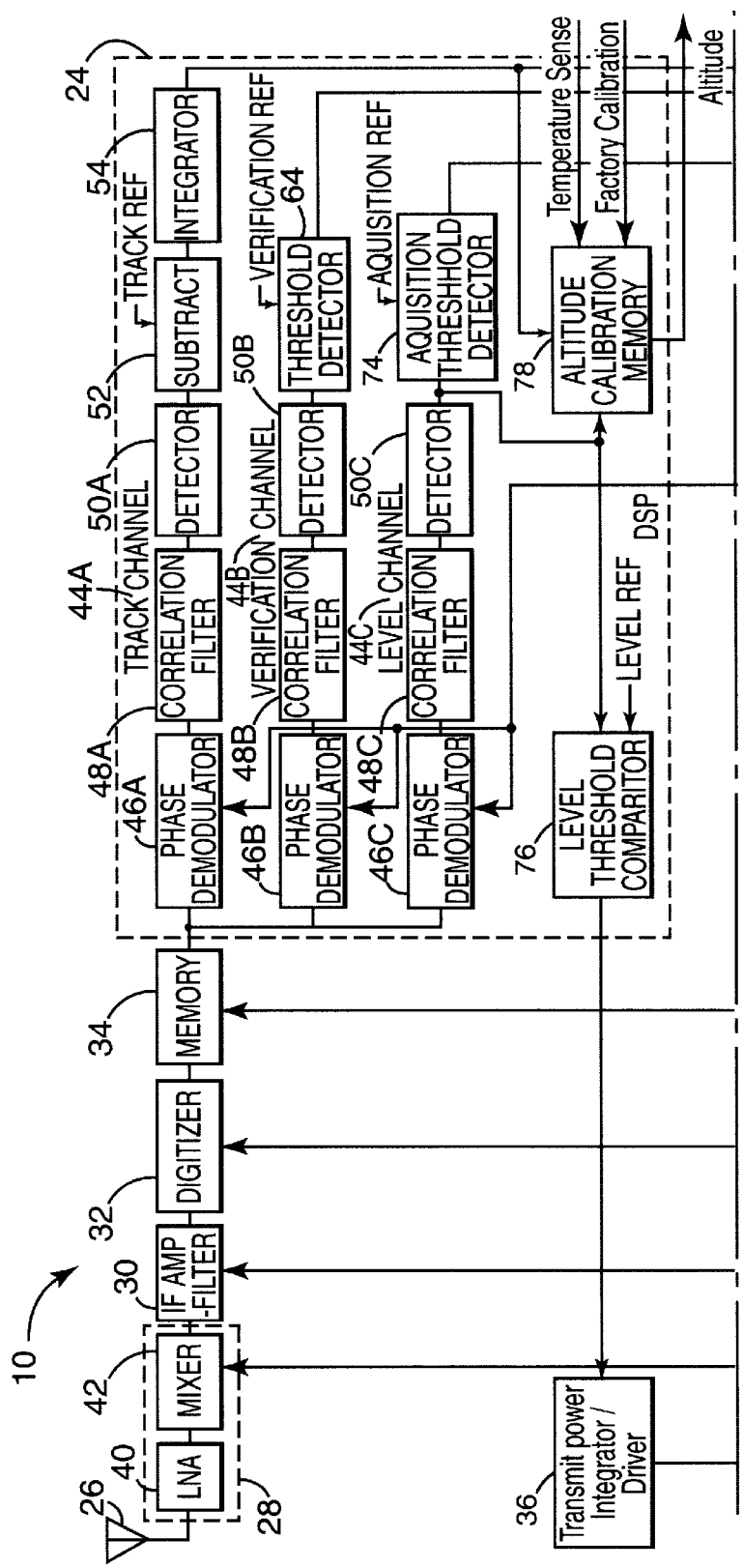
FIG. 2 shows a second block diagram of the radar altimeter of the present invention, including additional detail regarding the sequencer and digital signal processor.
Figure 2B:
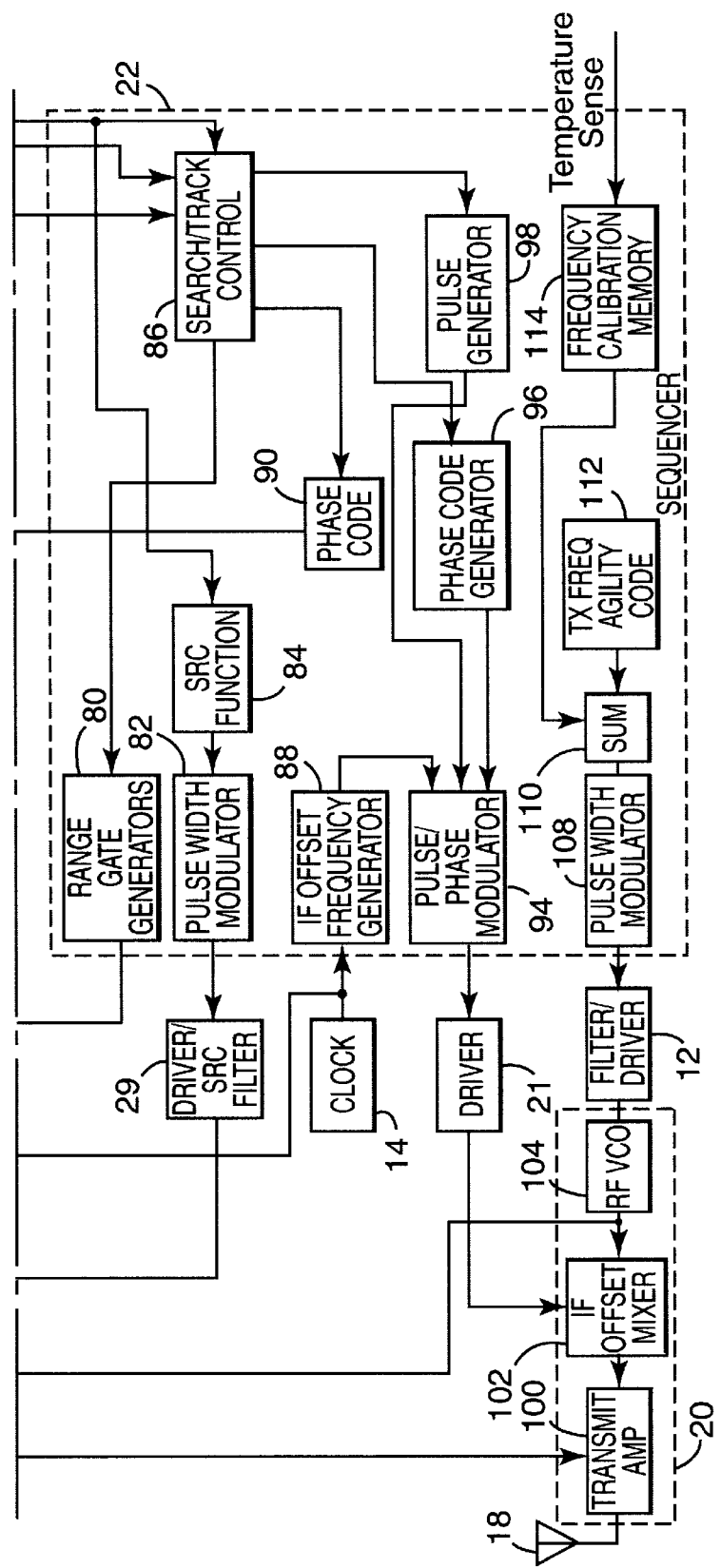

FIG. 2 shows a second block diagram of the radar altimeter of the present invention, including additional detail regarding sequencer 22 and DSP 24. As shown in FIG. 2, receiver 28 includes low noise amplifier (LNA) 40 and mixer 42. Transmitter 20 includes transmit amplifier 100, IF offset mixer 102, and radio frequency (RF) VCO 104.

DSP 24 includes track channel 44A, verification channel 44B, level channel 44C and altitude calibration memory 78. Track channel 44A includes phase demodulator 46A, correlation filter 48A, detector 50A, subtraction block 52 and integrator 54. Verification channel 44B includes phase demodulator 46B, correlation filter 48B, detector SOB and threshold detector 64. Level channel 44C includes phase demodulator 46C, correlation filter 48C, detector 50C, acquisition threshold detector 74 and level threshold comparator 76. In a preferred embodiment, all of the components of DSP 24 are implemented in software, although hardware could also be used.

Sequencer 22 includes range gate generators 80, pulse width modulator 82, sensitivity range control (SRC) block 84, search/track control block 86, IF offset frequency generator 88, range delayed phase code generator 90, pulse/phase modulator 94, phase code generator 96, pulse generator 98, pulse width modulator 108, sum block 110, transmit frequency agility code block 112 and frequency calibration memory 114. In a preferred embodiment, sequencer 22 is a field programmable gate array (FPGA).

The components shown in FIG. 2 that are responsible for generating a radar signal for transmission, along with the format of the transmitted signal, will be discussed first with reference to FIGS. 2–4. These components include transmit antenna 18, transmitter 20, filter/driver 12, driver 21, clock 14 and sequencer 22. Following the discussion of the transmission of a radar signal, the components for receiving and processing the radar signal are discussed, again with reference to FIG. 2. These components include receive antenna 26, receiver 28, IF amplifier-filter 30, digitizer 32, memory 34 and DSP 24.

To generate a radar signal, clock 14 provides a clock signal to IF offset frequency generator 88. In a preferred embodiment, clock 14 operates at a frequency of 120 MHz, although other frequencies may be used. IF offset frequency generator 88 generates an offset signal for the radar transmission signal. In a preferred embodiment, IF offset frequency generator 88 divides the input clock signal from clock 14 by four, and outputs a clock signal at 30 MHz.

Pulse/phase modulator 94 receives phase code and pulse data from phase code generator 96 and pulse generator 98, pulse modulates and phase modulates the offset signal received from IF offset frequency generator 88, and outputs the modulated signal to driver 21.

Figure 3A:
FIGS. 3A–3D show an example of the generation of the modulation for the transmission signal.
Figure 3B:
Figure 3C:
Figure 3D:

FIGS. 3A–3D show an example of the generation of the modulation for the transmission signal. FIG. 3A shows the 30 MHz offset signal from IF offset frequency generator 88. FIG. 3B shows a portion of a phase code provided by phase code generator 96. The phase code signal includes two phases—high (0 degrees) and low (180 degrees). FIG. 3C shows pulses generated by pulse generator 98. FIG. 3D shows the 30 MHz offset signal after pulse and phase modulation. As shown in FIG. 3D, modulator 94 passes the 30 MHz waveform for in-phase, and inverts at phase transitions. Modulator 94 uses the pulses generated by pulse generator 98 to bound the phase modulated waveform within the desired pulse widths.

Figure 4A:
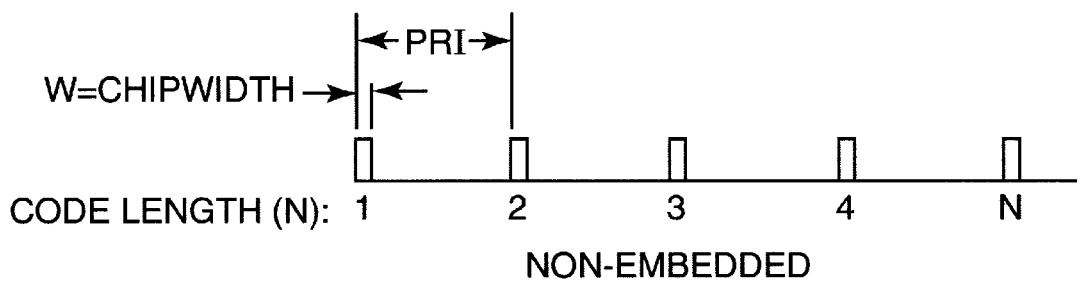
FIGS. 4A–4B show a preferred fornat for the transmission signal.
Figure 4B:
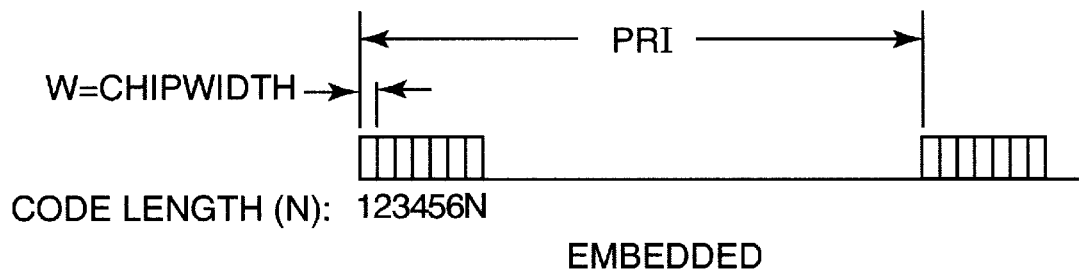

FIGS. 4A–4B show a preferred format for the transmission signal. At low altitudes (FIG. 4A), a non-embedded code is generated, consisting of individual Bi-phase modulated, relatively narrow pulses referred to as "chips". Each chip represents one bit of a code word. In a preferred embodiment, a 31 bit code word (N=31) is used by radar altimeter 10, although other code lengths maybe used. The width of each chip is preferably 8 to 64 nsec or 4 to 32 radar feet to provide the high accuracy desired at low altitudes. The spacing between chips or pulse repeat interval (PRI) is four microseconds in a preferred embodiment. A 31 bit code word in the non-embedded format, then, consists of 31 pulses spaced four microseconds or 2000 feet for a total word length of 31×2000=62,000 feet. Thus, a code word would repeat each 62,000 feet, resulting in a non-ambiguous operation to over 62,000 feet altitude.

Typically, narrower transmit pulses result in better accuracy. However, there is not much energy in narrow pulses, so they do not work as well for higher altitudes. Wider pulses tend to provide increased sensitivity, but less accuracy. At higher altitudes (FIG. 4B), the entire code word is embedded in a single, wide pulse, with individual modulation chips that are also relatively wide, resulting in large duty cycles at the higher altitudes where maximum sensitivity is desired, and accuracy is of less concern. A 31 bit embedded format, for example, at very high altitudes (e.g., around 40,000 feet) could consist of 31 phase modulated chips, each 416 feet wide (832 nsec) with a total pulse width equal to 416×31= 12,896 feet wide, resulting in a duty cycle of about 20% with a 64,000 feet pulse repeat interval.

The modulation of the transmit signal is designed to spread the transmitted frequency spectrum, resulting in a signal with a very low probability of detection by enemy intercept receivers. The modulation additionally allows fine range resolution with large transmitted pulse widths, allowing operation with very high duty cycle, resulting in greater sensitivity with lower peak energy.

Driver 21 amplifies the signal received from pulse/phase modulator 94 and outputs the amplified signal to IF offset mixer 102. IF offset mixer 102 mixes the 30 MHz pulse and phase modulated signal from driver 21 with an RF signal from RF VCO 104, resulting in a 30 MHz offset of the RF signal. Mixer 102 also performs a single side band conversion to attenuate an undesired sideband. IF offset mixer 102 outputs the offset signal to transmit amplifier 100. Transmit amplifier 100 amplifies the signal to provide the power required to generate a sufficient ground return signal. Transmit antenna 18 transmits the amplified signal toward the ground.

RF VCO 104 preferably operates at about 4.3 GHz. The frequency of RF VCO 104 varies with temperature. If the output were to vary too much, the wide band transmit signal could be outside the bandwidth of antennas 18 and 26. Temperature sensor 16 (shown in FIG. 1) provides temperature data, which serves as an input to a temperature compensation look-up table stored in frequency calibration memory 114. The temperature compensation look-up table is designed to maintain the median frequency of RF VCO 104 at the center of the relatively narrow antenna band while operating under temperature variations. RF VCO 104 is controlled to frequency hop about the desired 4.3 GHz median operating frequency. Frequency agility or frequency hopping further spreads the frequency spectrum of the transmitted signal, decreasing the probability of detection. Frequency agility of RF VCO 104 is provided by a look-up table in transmit frequency agility code block 112, which contains a random code. Based on the random code stored in the look-up table, transmit frequency agility code block 112 outputs frequency change data to sum block 110. Sum block 110 adds the frequency change data to temperature compensation data from frequency calibration memory 114, and generates a number representation of the desired operating frequency. Pulse width modulator 108 uses the resulting number to produce a corresponding pulse width modulated signal, which is output to filter/driver 12. The pulse width modulated signal is filtered by filter/driver 12 to provide a DC voltage of sufficient level to drive RF VCO 104. The pulse width modulation and subsequent filtering is an inexpensive means for converting the digital output to analog without the use of a D/A converter.

After a radar signal is transmitted, the signal reflected from the ground is received by receive antenna 26. The return signal received by receive antenna 26 is amplified by LNA 40. Mixer 42 mixes the amplified return signal with the RF oscillator signal output by RF VCO 104, and outputs an IF offset signal to IF amplifier-filter 30. The IF offset signal is amplified by IF amplifier-filter 30 and output to digitizer 32.

The sensitivity of IF amplifier-filter 30 is adjusted based upon the current altitude in order to prevent radar altimeter 10 from tracking a leakage signal. A leakage signal is a signal that passes directly from transmit antenna 18 to receive antenna 26 without first being reflected by the ground. The leakage signal represents zero feet, since there is virtually no delaybchveen transmission and receiving. Since radar altimeter 10 must operate down to zero feet, there is a danger that it may lock onto the leakage signal. Therefore, to prevent this false altitude lock, the sensitivity of IF amplifier-filter 30 is adjusted based on altitude. SRC function block 84 receives current range data from integrator 54. Based upon the current range, SRC function block 84 outputs an attenuation control signal. The combination of pulse width modulator 82 and driver/SRC filter 29 convert the digital attenuation control signal to an analog signal, which is output to IF amplifier-filter 30. The attenuation control signal causes IF amplifier-filter 30 to increase attenuation of the IF return signal at low altitudes, and decrease attenuation at higher altitudes. The ground return signal at low altitudes is much greater than the leakage signal, so the ground return signal passes through IF amplifier-filter 30, while the leakage signal is blocked.

Digitizer 32 digitizes the received IF signal and outputs the samples to memory 34. The frequency of clock 14 determines the rate that the incoming IF analog signals are sampled and digitized by digitizer 32. Thus, in a preferred embodiment, digitizer 32 samples the IF return signal at a 120 MHz rate, providing samples every 1/120 MHz=8 nsec (i.e., approximately 4 radar feet). The samples are converted to voltage amplitude numbers and stored in memory 34 for processing by DSP 24.

Memory 34 is preferably a dual-port RAM. One half of memory 34 is sized to hold one word interval of samples. In a preferred embodiment, the word length is about 120 microseconds, so approximately 15,000 samples per word are taken (i.e., 120 microseconds/8 nsec). At the same time that the first one half of memory 34 is being loaded, sequencer 22 unloads selected samples of the previous word from the second one half of memory 34 into DSP 24 for processing. Thus, the tvo halves of memory 34 are being toggled between loading incoming samples and unloading samples from the previous word interval. Under the control of search/track control block 86, range gate generator 80 of sequencer 22 select samples for processing by DSP 24 based on an internal range generated by DSP 24. Memory 34 can also be a FIFO (first in first out). In this embodiment, sequencer 22 can enable the FIFO to just capture the digitized RF pulse during the interval of the return signal. Sequencer 22 can then signal DSP 24 to begin processing the digitized signal. In this way, the system is processing each return pulse as they occur and not accumulating complete word lengths before processing as described in the previous paragraph.

The three channels 44A–44C of DSP 24 perform identical functions up to the output of detectors 50A–50C. Phase demodulators 46A–46C strip the Bi-phase modulation off the return signal samples received from memory 34. Phase demodulators 46A–46C output a digitally sampled IF signal with no discontinuities (i.e., phase modulation is removed) to correlation filters 48A–48C.

To properly demodulate the return signal samples, phase demodulators 46A–46C must be provided with the phase code of the transmitted signal. Range delayed phase code generator 90 provides the same phase data produced by phase code generator 96 for the transmission signal, but delayed by a time corresponding to the current range. Search/track control 86 delays the phase code generated by range delayed phase code generator 90 an amount of time corresponding to the current range provided by track channel 44A. For example, at an altitude of 5000 feet, the ground return signal is delayed 5000 feet or ten microseconds after each transmit pulse. With 2000 feet pulse spacings, the return from the first pulse of the word appears after the third pulse is transmitted. Thus, sequencer 22 must provide phase demodulators 46A–46C the phase code delayed by three pulses for proper code line up and demodulation at this example altitude.

Correlation filters 48A–48C are band-pass filters with a bandwidth on the order of 10 KHz, which is narrow enough to integrate an entire 120 microsecond word length, but wide enough to pass the doppler shift associated with extreme aircraft climbs or dives. Correlation filters 48A–48C integrate the samples received from phase demodulators 46A–46C and, if there is proper phase code line up, output an intermediate frequency digitally sampled sine wave to detectors 50A–50C. Interference eeorjamming signals without the proper coding arc rejected.

The center frequency of correlation filters 48A–48C is a direct function of the sampling frequency of digitizer 32. Thus, as the sampling frequency drifts, the center frequency of filters 48A–48C will drift proportionately. Since the digitizer sampling frequency must be greater than approximately two times the maximum IF frequency (i.e., sampling frequency=IF center frequency+signal bandwidt/2), the sampling frequency oscillator source (clock 14) is divided to provide the IF offset. Because the IF offset signal is generated by dividing the sampling frequency produced by clock 14, the IF offset signal will drift along with any drift in the sampling frequency. Thus, as the sampling frequency drifts, the center frequency of filters 48A–48C will drift the same amount, and the IF offset frequency will drift the same amount, resulting in the return signal being centered in the narrow band filters 48A–48C.

Detectors 50A–50C output a DC signal with an amplitude that is derived from the signal level of the digital sine wave output by correlation filters 48A–48C. To produce the DC signal, detectors 50A–50C first drop the sign bit of the digital sine wave, which results in full wave rectification. Detectors 50A–50C then low pass filter the digital full wave rectified signal to produce a relatively slow changing DC component.

Track channel 44A determines a range tracking error associated with the selected return signal samples by "range gating" the leading edge of the return signal. Radar range is determined by the amount of time it takes for a transmitted pulse to hit a target and then return. A range gate, such as that used in range gate generators 80, is essentially a switch that only allows selected samples of the return signal to be processed. In some contexts, a "range gate" implies a switch that may be closed for a finite length of time, but in the digital signal processing context, range gates correspond to discrete samples. The return signal can not get through the range gate until the point in time at which the switch is closed. For example, if a range gate is set to a range of 1000 feet, the range gate will wait 2 microseconds (which is the amount of time corresponding to a range of 1000 feet) after transmission, and then close to allow the sampled return signal to pass through.

Range gate generators 80 are responsible for selecting samples based on a current internal range provided by DSP 24. Range gate generators 80 select different samples for each of channels 44A–44C. For track channel 44A, range gate generators 80 generate range gates with the same spacing as the pulses of the transmit signal, but delayed based on the current internal range. The range gates are positioned to overlap the leading edge of the return signal.

Track channel 44A measures the energy contained in the samples of the very leading edge of the return signal. This measured level, output by detector 50A, is compared to a track reference level through subtraction by subtraction block 52, resulting in a track error. The track error is output to integrator 54, which integrates the error. If the current gate position overlaps the return at a point too far into the return (i.e., the altitude tracking point is too high), the track error generated by subtraction block 52 will cause integrator 54 to decrease its output level or digital number to a lower number. The number output by integrator 54 represents internal range. The internal range number is used by search/track control block 86 to determine the selection of future samples to be processed. More specifically, search/track control block 86 converts the internal range number to a radar delay time position, and causes range gate generators 80 to generate a new gate.

Verification channel 44B helps to maintain correct phase code line up with the return by monitoring the level resulting from sampling all the possible ambiguous return positions, thereby creating an auto correlation function. Proper line up is associated with the main range lobe of the function. The phase code is designed so that, if a code word is lined up on the wrong return pulse (causing an ambiguous return position), the digital sine wave that is output by correlation filter 48B will be attenuated by an amount in direct relation to the number of chips in the word length. Thus, as the code is moved through the return, an auto correlation function results with the main lobe of the function associated with code line up, and attenuated range side lobes resulting at code misalignments. The level measured in response to each new sampling position (controlled by range gate generators 80) is input to threshold detector 64, which compares the level to a verification reference level. The verification reference level corresponds to the main lobe of the auto correlation function. When the level of the signal from detector 50B exceeds the verification reference level, threshold detector 64 changes its output from low to high, thereby providing an indication to search/track control block 86 that the phase code is correctly lined up with the return signal.

Level channel 44C regulates the transmit power for the minimum required to provide reliable altimeter operation and holds the level of the return signal constant so that the energy measured by track channel 44A is directly related to the position of the track gate and not to variations in amplitude of the return signal. If the amplitude of the return signal varies, the energy overlapped by the track gate also varies, which may cause range gate generators 80 to move the gate even though it may be appropriately positioned at the leading edge of the return. For level channel 44C, range gate generators 80 select return samples that are offset outbound in time or range from the samples selected for track channel 44A, so that the return pulse energy beyond the leading edge is measured and output by detector 50C. Thus, as the track gate dithers around at the leading edge of the return signal to maintain an average integrated "0" error at integrator 54, the level gate dithers with it, but selecting samples on the flat or constant portion of the return.

Level threshold comparator 76 compares the level of the signal output by detector 50C to a desired level reference. Level threshold comparator 76 outputs a duty cycle modulated signal to transmit power integrator/driver 36. Transmit power integrator/driver 36 responds to the duty cycle modulated signal in a direction to correct the transmit power level and hold the received amplitude constant. For return signals with a level greater than the desired reference level (i.e., a level higher than that required for return tracking), level threshold comparator 76 sends the integrator 36 output in a direction to reduce the transmit power of transmit amplifier 100. When the level of the return signal drops below the level reference, the integrator 36 output is driven to increase transmit power.

Detector 50C also outputs a sampled portion of the return to acquisition threshold detector 74 and altitude calibration memory 78. Acquisition threshold detector 74 is a comparator that is used when radar altimeter 10 is first turned on and the range gate is not yet tracking the leading edge of the return signal. Range gate generators 80 move the range gate outbound from zero feet until it overlaps the return signal. When the range gate overlaps the leading edge of the return signal, the signal output by detector 50C will exceed the acquisition reference level. Acquisition threshold detector 74 compares the signal from detector 50C with the acquisition reference level, and changes its output from low to high when the acquisition reference level has been exceeded. The high signal from acquisition threshold detector 74 provides an indication to search/track control block 86 that the leading edge has been found.

Altitude calibration memory 78 generates and outputs altitude data based on the signals output by detector 50C and integrator 54. Altitude calibration memory 78 corrects the altitude data based on temperature data provided by temperature sensor 16 and stored factory calibration data. The stored factory calibration data is used to correct the altitude data for signal delays, such as those caused by the cables connecting the antennas to the signal processing equipment.

Although the present invention has been described with reference to preferred embodiments, workers skilled in the art will recognize that changes may be made in form and detail without departing from the spirit and scope of the invention.

What is claimed is:

1. A radar altimeter for determining altitude of an air vehicle with respect to ground, the radar altimeter comprising:
    a digital sequencer for digitally pulse-width and phase modulating a first signal;
    a transmitter coupled to the digital sequencer for transmitting a radar signal including the modulated first signal toward the ground;
    a receiver for receiving a reflected radar signal from the ground, the received radar signal including the modulated first signal;
    a digitizer coupled to the receiver for generating digital samples of the modulated first signal; and
    a digital signal processor coupled to the digitizer, the digital signal processor receiving digital samples of the modulated first signal from the digitizer, demodulating the received digital samples, processing the demodulated digital samples and outputting altitude data based on the demodulated digital samples.

2. A radar altimeter for determining altitude of an air vehicle with respect to ground, the radar altimeter comprising:
    a digital sequencer for digitally modulating a first signal, wherein the digital sequencer is a field programmable gate array (FPGA);
    a transmitter coupled to the digital sequencer for transmitting a radar signal including the modulated first signal toward the ground;

a receiver for receiving a reflected radar signal from the ground, the received radar signal including the modulated first signal;

a digitizer coupled to the receiver for generating digital samples of the modulated first signal; and a digital signal processor coupled to the digitizer, the digital signal processor receiving digital samples of the modulated first signal from the digitizer, demodulating the received digital samples, processing the demodulated digital samples and outputting altitude data based on the demodulated digital samples.

3. The radar altimeter of claim 1, wherein the digital sequencer provides phase modulation data to the digital signal processor to demodulate the first signal.

4. The radar altimeter of claim 1, and further comprising a clock signal generator coupled to the digitizer, the clock signal generator generating a radio frequency clock signal, the clock signal establishing a sampling frequency for the digitizer.

5. The radar altimeter of claim 4, wherein the sampling frequency of the digitizer is greater than about 100 MHz.

6. The radar altimeter of claim 4, wherein the digital sequencer further comprises an intermediate frequency generator coupled to the clock signal generator, the intermediate frequency generator generating the first signal from the clock signal.

7. The radar altimeter of claim 1, and further comprising a radio frequency oscillator and a mixer, the radio frequency oscillator generating a second signal, the mixer coupled to the radio frequency oscillator and to the digital sequencer, the mixer mixing the first and the second signals to produce a radar signal for transmission.

8. The radar altimeter of claim 7, wherein the digital sequencer further comprises frequency agility means coupled to the radio frequency oscillator for generating a frequency control signal based on stored code data and temperature data, the frequency control signal varying the frequency of the second signal.

9. The radar altimeter of claim 8, wherein the frequency control signal is a pulse width modulated signal.

10. The radar altimeter of claim 1, wherein the digital sequencer is a field programmable gate array (FPGA).

11. The radar altimeter of claim 1, and further comprising a filter for filtering the received modulated first signal, and wherein the digital sequencer further comprises a sensitivity range controller for generating an attenuation control signal causing the filter to increase attenuation of the received modulated first signal with decreasing altitude.

12. The radar altimeter of claim 11, wherein the attenuation control signal is a pulse width modulated signal.

13. The radar altimeter of claim 1, wherein the digital signal processor fun her comprises transmit power control means for comparing the level of the received radar signal with a predetermined threshold signal level, and outputting a transmit power control signal for controlling the power of the transmitted radar signal.

14. The radar altimeter of claim 1, wherein the digital signal processor further comprises means for rejecting signals originating from a source other than the transmitter.

15. The radar altimeter of claim 1, and further comprising a memory for storing digital samples output by the digitizer, the memory controlled by the digital sequencer to output selected digital samples to the digital signal processor.

16. A method for determining altitude of an air vehicle with respect to ground, the method comprising:

digitally pulse-width and phase modulating a first signal;

transmitting a radar signal including the modulated first signal toward the ground;

receiving a reflected radar signal from the ground, the received radar signal including the modulated first signal;

generating digital samples of the modulated first signal; and digitally demodulating selected digital samples and generating altitude data based on the demodulated selected digital samples.

17. The method of claim 16, and further comprising:

digitally generating a frequency control signal based on stored code data and temperature data, the frequency control signal varying the frequency of the transmitted radar signal; and digitally comparing the level of the received radar signal with a predetermined threshold signal level, and outputting a transmit power control signal for controlling the power of the transmitted radar signal.

18. The method of claim 16, and further comprising:

generating a radio frequency clock signal, the clock signal establishing a sampling frequency for the generation of the digital samples.

19. The method of claim 18, wherein the first signal is generated from the clock signal.

20. A radar altimeter for determining altitude of an air vehicle with respect to ground, the radar altimeter comprising:

a digital sequencer for digitally modulating a first signal;

a transmitter coupled to the digital sequencer for transmitting a radar signal including the modulated first signal toward the ground;

a receiver for receiving a reflected radar signal from the ground, the received radar signal including the modulated first signal;

a digitizer coupled to the receiver for generating digital samples of the modulated first signal;

a digital signal processor coupled to the digitizer, the digital signal processor receiving digital samples of the modulated first signal from the digitizer, demodulating the received digital samples, processing the demodulated digital samples and outputting altitude data based on the demodulated digital samples;

a radio frequency oscillator and a mixer, the radio frequency oscillator generating a second signal, the mixer coupled to the radio frequency oscillator and to the digital sequencer, the mixer mixing the first and the second signals to produce a radar signal for transmission; and wherein the digital sequencer further comprises frequency agility means coupled to the radio frequency oscillator for generating a frequency control signal for varying the frequency of the second signal.

21. The radar altimeter of claim 20, wherein the frequency agility means generates the frequency control signal based on stored code data.

22. The radar altimeter of claim 20, wherein the frequency agility means generates the frequency control signal based on temperature data and stored code data.

23. The radar altimeter of claim 20, wherein the frequency control signal is a pulse width modulated signal.

24. A radar altimeter for determining altitude of an air vehicle with respect to ground, the radar altimeter comprising:

a digital sequencer for digitally modulating a first signal;

a transmitter coupled to the digital sequencer for transmitting a radar signal including the modulated first signal toward the ground;

a receiver for receiving a reflected radar signal from the ground, the received radar signal including the modulated first signal;

a digitizer coupled to the receiver for generating digital samples of the modulated first signal;

a digital signal processor coupled to the digitizer, the digital signal processor receiving digital samples of the modulated first signal from the digitizer, demodulating the received digital samples, processing the demodulated digital samples and outputting altitude data based on the demodulated digital samples; and a filter for filtering the received modulated first signal, and wherein the digital sequencer further comprises a sensitivity range controller for generating an attenuation control signal causing the filter to increase attenuation of the received modulated first signal with decreasing altitude.

25. The radar altimeter of claim 24, wherein the attenuation control signal is a pulse width modulated signal.

26. A method for determining altitude of an air vehicle with respect to ground, the method comprising:

digitally modulating a first signal;

transmitting a radar signal including the modulated first signal toward the ground;

receiving a reflected radar signal from the ground, the received radar signal including the modulated first signal;

generating digital samples of the modulated first signal;

digitally demodulating selected digital samples and generating altitude data based on the demodulated selected digital samples; and digitally generating a frequency control signal based on stored code data, the frequency control signal varying a frequency of the transmitted radar signal.

27. The method of claim 26, wherein the frequency control signal is generated based on the stored code data and on temperature data.

28. The method of claim 26, and further comprising:

digitally comparing the level of the received radar signal with a predetermined threshold signal level, and outputting a transmit power control signal for controlling the power of the transmitted radar signal.

* * * * *

UNITED STATES PATENT AND TRADEMARK OFFICE
CERTIFICATE OF CORRECTION

PATENT NO. : 6,407,697 B1  Page 1 of 1
DATED : June 18, 2002
INVENTOR(S) : James R. Hager, Curtis J. Petrich and John H. Keuper It is certified that error appears in the above-identified patent and that said Letters Patent is hereby corrected as shown below:

<u>Column 9,</u>
Line 25, replace "fun her" with -- further --.

Signed and Sealed this

Thirtieth Day of July, 2002

Attest:

JAMES E. ROGAN
Attesting Officer  Director of the United States Patent and Trademark Office